Figure 1:
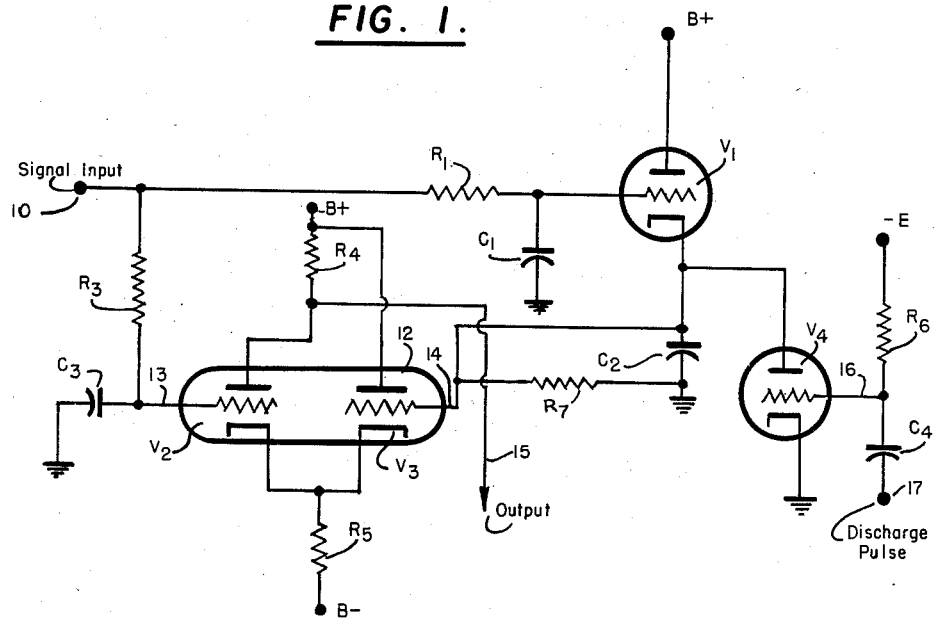

May 13, 1958  H. LUKOFF  2,834,883
PEAK AMPLITUDE INDICATOR
Filed Oct. 12, 1955

INVENTOR.
HERMAN LUKOFF
BY
*Charles C. English*
AGENT

United States Patent Office 2,834,883
Patented May 13, 1958

2,834,883

PEAK AMPLITUDE INDICATOR

Herman Lukoff, Philadelphia, Pa., assignor to Sperry Rand Corporation, New York, N. Y., a corporation of Delaware Application October 12, 1955, Serial No. 540,019

15 Claims. (Cl. 250—27)

The present invention relates to systems permitting the time determination of the peak amplitude of a signal; and is more particularly concerned with a novel circuit capable of giving such peak amplitude indications more effectively than has been the case in the past.

In many forms of electronic apparatus, it is important to determine the time at which a varying amplitude signal reaches a peak value. For instance, in information handling systems, such a time factor determination is necessary in providing a method for discriminating between pulses. In the past, peak amplitude indicating systems have taken the form of double differentiators or various types of amplitude sensitive devices; but these known forms of indicator have been subject to the disadvantages that they do not exhibit sufficiently high selectivity to provide the accuracy of indication necessary in certain applications. In addition, these known systems often exhibit relatively small signal-to-noise ratios thereby again detracting from the effectiveness of the indication.

The present invention serves to obviate the foregoing difficulties, and provides an improved peak amplitude indicator which determines the amplitude peak of a pulse by responding to a change or reversal in slope of an input signal. In this respect, therefore, the present invention preferably employs a differential amplifier which produces no output during times when an input signal has a positive slope, but which, through the provision of a capacitive storage device, responds to an incipient negative slope thereby to produce an output representative of this signal change from a positive to a negative slope.

It is accordingly an object of the present invention to provide an improved peak amplitude indicator.

A further object of the present invention resides in the provision of peak amplitude indicators having a higher degree of selectivity than that of other amplitude sensitive systems known heretofore.

A further object of the present invention resides in the provision of a peak amplitude indicator having a greater signal-to-noise ratio than known double differentiation systems.

Another object of the present invention resides in the provision of a peak amplitude indicator having better operating characteristics than those known heretofore.

A still further object of the present invention resides in the provision of a novel circuit capable of determining the time of peak amplitude of an input signal, thereby to provide discrimination between a plurality of pulses in information handling systems.

Figure 2:
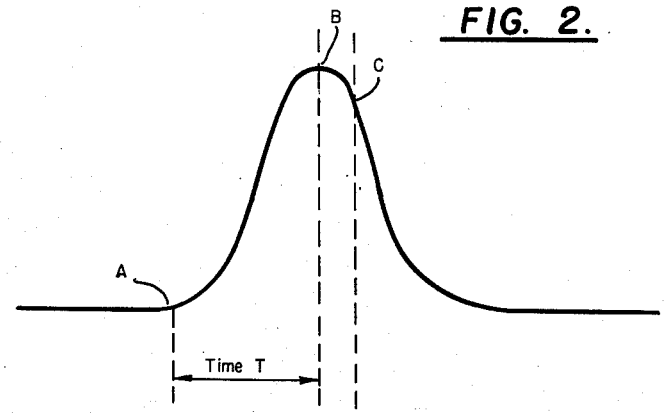

The foregoing objects, advantages, construction and operation of the present invention will become more readily apparent from the following description and accompanying drawings, in which:

Figure 1 is a circuit diagram of a peak amplitude indicator constructed in accordance with a preferred embodiment of the present invention; and Figure 2 is a waveform representative of a typical input signal and illustrating the operation of the circuit shown in Figure 1.

Referring now to the figures, it will be seen that, in accordance with the present invention, a peak amplitude indicator may comprise a first vacuum tube V1 having its grid coupled via an input network R1—C1 to an input terminal 10, and having a capacitor C2 coupled to the cathode thereof. Signals applied to terminal 10, which may take the form shown in Figure 2, for instance, are thus applied to the grid of vacuum tube V1. These signals are also applied, via a further input network R3—C3, to the grid of a vacuum tube V2, comprising one-half of double triode V2—V3 contained in an envelope 12.

The anode of vacuum tube V2 is coupled via impedance R4 to a source of B+ (e. g. +200 v.), while the anode of tube V3 is directly connected to the said source B+. The cathodes of the vacuum tubes V2 and V3 are coupled to one another and thence via a constant current impedance R5 to a relatively large source B— (e. g. —200 v.). It will be appreciated that the arrangement of vacuum tubes V2 and V3, in combination with anode and cathode impedances R4 and R5, respectively, comprises a differential amplifier responsive to signals applied to vacuum tubes V2 and V3 thereby to give no resultant output at terminal 15 when the said signals at grids 13 and 14 are the same; and to give a significant output at the said terminal 15 when the said signals are different in magnitude. Grid 14 of vacuum tube V3 is coupled to the capacitor C2, as shown, whereby the signal applied to vacuum tube V3 corresponds to the charge potential existing across capacitor C2, while the signal applied to vacuum tube V2 corresponds to the input signal appearing at terminal 10.

Vacuum tube V1 is a high current tube capable of charging capacitor C2 very rapidly; and as a result, the charge potential across capacitor C2, during times when the signal input applied to terminal 10 is increasing in magnitude (positive slope), will correspond to the instantaneous magnitude of the signal input applied to terminal 10. The charge potential across capacitor C2 will not tend to follow decreases in input signal magnitude, since capacitor C2 does not have a good discharge path other than via a vacuum tube V4. In this respect it should be noted that resistor R7, which may be provided to prevent the grid of tube V3 from assuming free potential and charging capacitor C2 during long "no-signal" periods, is so chosen in magnitude that capacitor C2 cannot discharge rapidly therethrough. The grid 16 of tube V4 is coupled to a source of negative potential —E, via an impedance R6, whereby the said vacuum tube V4 is normally cut off. The grid 16 of vacuum tube V4 is further coupled via a capacitor C4 to a terminal 17, however, whereby selective positive-going discharge pulses may be applied, overcoming the source —E and rendering vacuum tube V4 conductive, thereby selectively to discharge capacitor C2.

In operation, a signal input at terminal 10 applies substantially like inputs to the grids 13 and 14 of differential amplifier V2—V3, so long as the said signal input has a positive slope. When the signal reaches a peak and commences to decrease, however, the input to vacuum tube V3 remains substantially at the peak potential of the signal, due to the peak detecting function of capacitor C2, while the signal input on grid 13 of tube V2 follows the input signal as it falls below its peak value. Thus, once the input signal has reached and passed its peak, the differential amplifier V2—V3 produces a significant resultant output, at output point 15, which is representative of the time at which this peak amplitude of input signal has occurred. The capacitor C2 may thereafter be discharged by applying a discharging pulse to terminal 17 thereby to prepare the circuit for the reception of a next subsequent positive-going input signal.

The foregoing operation will become more readily apparent from a consideration of the waveform shown in Figure 2. Inasmuch as B— is large, say —200 v., so that R5 is a constant current resistor, the current in R5 splits between V2 and V3 when input 10 is at ground potential in the absence of a signal (prior to time A). In this no-signal state, therefore, the anode of tube V2 (corresponding to output point 15) is at a low potential. A signal input may thereafter commence a positive-going excursion at a point "A" and may continue to rise in magnitude until a peak value "B" is reached. During the time A—B, the signal input applied to terminal 10 is coupled via the networks R1—C1 and R3—C3, to the grids of vacuum tubes V1 and V2. That portion of the signal coupled to vacuum tube V1 causes capacitor C2 to charge rapidly whereby the instantaneous potential across capacitor C2 corresponds substantially to the instantaneous potential of the rising signal input at terminal 10.

The rising signal applied to the grid of tube V2 tends to lower the anode potential of tube V2 further, but this further reduction in anode potential is relatively slight, e. g. 10%, due to the large normal current in that tube. Inasmuch as the potential appearing across capacitor C2 is coupled to the grid 14 of vacuum tube V3, and inasmuch further as the signal applied to grid 13 of vacuum tube V2 is the input signal, the differential amplifier V2—V3 will produce no appreciable resultant output during the rising portion of the signal input A—B (time interval T).

After the peak B has been reached by the signal input, the signal tends to decrease in magnitude. Capacitor C2, however, cannot readily follow this decrease of signal inasmuch as its primary discharge path, namely vacuum tube V4, is normally cut off. The capacitor C2 thus acts as a peak detector and maintains a charge potential equal substantially to the peak value B of signal input. With a reversal in signal, therefore, tube V3 remains conductive thereby maintaining the cathode potential of tubes V2 and V3. The falling signal at the grid of tube V2, however, cuts this tube off whereby the anode of tube V2 rises to B+. A large positive step (all the way to B+) thus occurs at output point 15 with this reversal in input signal.

In practice, it will be appreciated that the input signal must fall to a value somewhat below its peak B to provide the necessary differential signal input to amplifier V2—V3; and in the particular example shown, it has been assumed that a sufficiently great fall has been experienced at a point C on the signal input curve. The actual distance between points B and C required to effect the desired output signal at terminal 15 will be dependent upon the sensitivity of the device and this sensitivity may in fact be made extremely high. However, due to the necessity of a decrease in signal to a point C below the peak value B, the output signal appearing at terminal 15 will be delayed very slightly from the actual occurrence of the peak B. This very slight time delay is not important in the operation of the system, however, inasmuch as it is ordinarily desired merely to detect the occurrence of a peak thereby to provide a discrimination between successive pulses.

The discharging pulses applied to terminal 17 and serving to remove the peak charge appearing across capacitor C2, subsequent to a peak amplitude indication, may take the form of regularly occurring clock pulses in systems operating on a predetermined time scale; or may in the alternative, take the form of selectively applied pulses occurring subsequent to application of a signal input at terminal 10. It should further be noted that the input networks R1—C1 and R3—C3 are provided to reduce the effects of noise pulses on the operation of the circuit and in certain applications may be eliminated.

While the foregoing discussion has been concerned with a particular and preferred embodiment of the present invention, many variations therein will be suggested to those skilled in the art; and it must be understood, therefore, that the above discussion is meant to be illustrative only and should not be considered limitative of my invention; and all such variations as are in accord with the principles described are meant to fall within the scope of the appended claims.

Having thus described my invention, I claim:

1. In a control circuit, a differential amplifier having first and second inputs, a peak detector, means substantially simultaneously coupling a varying amplitude input signal to said first input and to said peak detector, said peak detector including unidirectional means for following said input amplitude variations in a single sense only, means coupling said peak detector to said second input, and means for taking an output from said differential amplifier in response to a difference in potential applied to the said first and second inputs.

2. The circuit of claim 1 wherein said peak detector comprises a capacitor, means for selectively discharging said capacitor subsequent to occurrence of an amplitude peak of said varying amplitude input signal, and means rendering said last-named means inoperative as said varying amplitude input signal increases in magnitude toward said amplitude peak.

3. The circuit of claim 1 wherein said peak detector comprises a vacuum tube responsive to said input signal for charging a capacitor, a normally inoperative discharge circuit coupled to said capacitor, and means selectively rendering said discharge circuit operative only after occurrence of an amplitude peak in said varying amplitude input signal.

4. In a control circuit, a capacitor, a normally inoperative discharge circuit coupled to said capacitor, a differential amplifier having one input coupled to said capacitor, means substantially simultaneously applying a varying amplitude signal input to said capacitor and to another input of said differential amplifier whereby said differential amplifier produces no output as said signal increases toward and to an amplitude peak and produces an output as said signal subsequently decreases from said amplitude peak, and means selectively rendering said discharge circuit operative subsequent to occurrence of said signal amplitude peak.

5. The control circuit of claim 4 wherein said means applying said signal input to said capacitor comprises a further amplifier.

6. In a control circuit, a differential amplifier comprising first and second vacuum tubes, a source of varying amplitude signals, a third vacuum tube having a signal amplitude peak responsive storage device coupled thereto, means substantially simultaneously coupling a signal from said source to said first and third vacuum tubes, said storage device including means for producing a control potential substantially equal in magnitude to said variable amplitude signal as said signal varies in a first sense toward an amplitude peak, said storage device including means maintaining said control output substantially at the magnitude of said signal peak as said signal varies in a second sense away from said amplitude peak, means coupling the control potential from said storage device to said second vacuum tube, and means for taking an output from the anode of one of said first and second vacuum tubes.

7. The circuit of claim 6 in which said signal source is coupled to said first and third vacuum tubes by a pair of R-C series networks, said signal source being connected to the resistive end of each of said networks, and means coupling the R-C junction of said networks to control grids of said first and third vacuum tubes respectively.

8. The circuit of claim 6 in which said peak responsive storage device comprises a capacitor, and a selectively operative discharge circuit coupled to said capacitor.

9. In a control circuit, first, second, and third grid controlled vacuum tubes, means coupling said first and second vacuum tubes to one another thereby to comprise a differential amplifier having first and second inputs, a storage capacitor in the cathode circuit of said third vacuum tube whereby said storage capacitor may be charged in a single sense only by the unidirectional current flowing through said third vacuum tube, a source of varying amplitude signals, means simultaneously coupling a signal from said source to the grids of said first and third vacuum tubes, and means coupling said storage capacitor to the grid of said second vacuum tube whereby the varying potentials at said first and second inputs are substantially equal to one another as said signal input increases to a peak magnitude, and the potentials at said first and second inputs are different as said signal input decreases subsequent to occurrence of said peak magnitude.

10. The circuit of claim 9 including a selectively operable discharge circuit coupled to said storage capacitor.

11. The circuit of claim 9 including R-C networks interposed between said source of signals and the grids of said first and third vacuum tubes for increasing the signal-to-noise ratio of said control circuit.

12. In a control circuit, a differential amplifier having first and second inputs, a signal amplitude peak detecting storage device, means substantially simultaneously coupling an input signal, the amplitude of which varies in two senses about an amplitude peak, to said first amplifier input and to said storage device whereby the potential at said first amplifier input follows the variations in amplitude of said input signal in both variation senses thereof, said peak detecting storage device including means for following the amplitude variation of said input signal only as said signal varies in a single sense toward a peak, and means coupling said storage device to the second input of said amplifier, whereby the potentials applied to said first and second inputs are substantially equal to one another as said signal increases in magnitude to a peak, and the potential at said second input becomes substantially fixed when said signal reaches said peak so that said potentials applied to said first and second inputs differ as said signal decreases in magnitude subsequent to occurrence of said peak.

13. The circuit of claim 12 including means clearing said storage device subsequent to occurrence of said signal peak.

14. The circuit of claim 13 wherein said storage device comprises a capacitor, said clearing means comprising a discharging circuit coupled to said capacitor, means maintaining said discharging circuit inoperative as said input signal varies in said single sense toward sad peak, and means for selectively rendering said discharging circuit inoperative subsequent to occurrence of said signal peak.

15. In combination, a source of input signals the amplitudes of which vary in two senses about a signal peak amplitude, a first input circuit coupled to said source, said first input circuit including means producing a first control signal which substantially follows the variations in amplitude of each of said input signals in both variation senses thereof, a second input circuit coupled to said source, said second input circuit including means producing a second control signal which substantially follows the variations in amplitude of each of said input signals only as said input signal varies in a first sense toward a peak amplitude, said second input circuit including means for holding the magnitude of said second control signal at a substantially fixed potential when said input signal varies in a second sense away from said peak amplitude, the parameters of said first and second input circuits being such that the magnitudes of said first and second control signals are substantially equal to one another as said input signal varies in said first sense toward said peak amplitude, a differential circuit having first and second inputs, means coupling said first and second control signals to said first and second differential circuit inputs, and output means coupled to said differential circuit and responsive to control signal magnitude differences at said first and second differential circuit inputs respectively.

References Cited in the file of this patent

UNITED STATES PATENTS

| 2,493,648 | Watton et al. | Jan. 3, 1950 |
| 2,545,464 | Hoeppner et al. | Mar. 20, 1951 |
| 2,609,501 | Guthrie | Sept. 2, 1952 |